(12) United States Patent
Berenbaum et al.

(10) Patent No.: US 7,707,437 B2
(45) Date of Patent: Apr. 27, 2010

(54) METHOD, SYSTEM, AND APPARATUS FOR A PLURALITY OF SLAVE DEVICES DETERMINING WHETHER TO ADJUST THEIR POWER STATE BASED ON BROADCASTED POWER STATE DATA

(75) Inventors: Alan D. Berenbaum, New York, NY (US); Raphael Weiss, Plainview, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 957 days.

(21) Appl. No.: 11/417,855

(22) Filed: May 3, 2006

(65) Prior Publication Data

US 2007/0260901 A1 Nov. 8, 2007

(51) Int. Cl.
*G06F 1/00* (2006.01)
(52) U.S. Cl. .................. 713/300; 713/320; 713/323; 709/208; 709/253
(58) Field of Classification Search ......... 713/300, 713/323; 709/208, 253
See application file for complete search history.

(56) References Cited

U.S. PATENT DOCUMENTS

| 6,092,209 | A  * | 7/2000  | Holzhammer et al. ....... 713/324 |
| 6,446,214 | B2   | 9/2002  | Chrysanthakopoulos |
| 6,496,895 | B1 * | 12/2002 | Harriman et al. ............ 710/306 |
| 6,895,517 | B2   | 5/2005  | Wang |
| 6,938,174 | B2   | 8/2005  | LeKech et al. |
| 6,947,776 | B2 * | 9/2005  | Vollmer et al. .............. 455/574 |
| 6,988,214 | B1   | 1/2006  | Verdun |
| 7,051,218 | B1 * | 5/2006  | Gulick et al. ............... 713/310 |
| 7,093,146 | B2 * | 8/2006  | Riley .......................... 713/310 |
| 7,174,467 | B1 * | 2/2007  | Helms et al. ................ 713/300 |
| 7,234,066 | B2 * | 6/2007  | Kojo .......................... 713/310 |
| 7,272,741 | B2 * | 9/2007  | Wilcox et al. ............... 713/503 |
| 7,296,167 | B1 * | 11/2007 | Hughes ....................... 713/310 |
| 7,315,952 | B2 * | 1/2008  | Wilcox et al. ............... 713/320 |
| 7,467,308 | B2 * | 12/2008 | Chang et al. ................. 713/300 |
| 2003/0182415 | A1 * | 9/2003 | Vicard ......................... 709/223 |

(Continued)

OTHER PUBLICATIONS

"GL824 USB 2.0 On-The-Go Controller", Datasheet Preliminary Revision 0.62, Apr. 19, 2005, Genesys Logic Incorporated, Taipei, Taiwan.

*Primary Examiner*—Thomas Lee
*Assistant Examiner*—Jaweed A Abbaszadeh
(74) *Attorney, Agent, or Firm*—Meyertons Hood Kivlin Kowert & Goetzel, P.C.; Jeffrey C. Hood

(57) ABSTRACT

A power state broadcast mechanism. A master device may broadcast a message through the use of a protocol to each of one or more slave devices to inform the slave devices of the power state of a computer system. The broadcast message may include a protocol header indicating the start of the broadcast transaction, a function type parameter indicating the type of broadcast transaction, and power state data indicating the power state of the computer system. Each of the slave devices may read the protocol header to detect the start of a broadcast transaction, and the function type parameter to determine the type of broadcast transaction. If the function type parameter indicates a power state broadcast transaction, each of the slave devices may read the power state data included in the broadcast message and determine whether to adjust the current power state of the slave device.

21 Claims, 7 Drawing Sheets

U.S. PATENT DOCUMENTS

| | | | |
|---|---|---|---|
| 2004/0025063 A1* | 2/2004 | Riley | 713/300 |
| 2004/0039949 A1* | 2/2004 | Vollmer et al. | 713/300 |
| 2005/0055589 A1* | 3/2005 | Kojo | 713/300 |
| 2005/0125702 A1 | 6/2005 | Huang et al. | |
| 2005/0204190 A1 | 9/2005 | Cromer et al. | |
| 2005/0273633 A1* | 12/2005 | Wilcox et al. | 713/300 |
| 2006/0153238 A1* | 7/2006 | Bar-On et al. | 370/473 |
| 2006/0168457 A1* | 7/2006 | Leech et al. | 713/300 |
| 2006/0168462 A1* | 7/2006 | Leech et al. | 713/310 |
| 2006/0215590 A1* | 9/2006 | Sharma et al. | 370/311 |
| 2006/0236139 A1* | 10/2006 | Chang et al. | 713/300 |
| 2007/0124608 A1* | 5/2007 | Knowlson et al. | 713/300 |

* cited by examiner

METHOD, SYSTEM, AND APPARATUS FOR A PLURALITY OF SLAVE DEVICES DETERMINING WHETHER TO ADJUST THEIR POWER STATE BASED ON BROADCASTED POWER STATE DATA

BACKGROUND OF THE INVENTION

1. Field of the Invention

This invention relates to data transfer methodologies and, more particularly, to a power state broadcast mechanism.

2. Description of the Related Art

In a typical PC system, particularly in mobile systems, saving power is important. To that end, individual devices within the system usually adjust their power consumption based on the state of system power. If the system has decided to enter a lower power mode, then all devices may also enter a lower power mode.

Most devices that are capable of responding to power state changes dedicate pins to power state signals. In addition, some devices include A/D converters to monitor voltage supplies and determine on their own the power state of the system, e.g., detect that a supply has been shut down and cause the device to enter a low power state.

Dedicating pins to power state signals may be expensive on very small or low-cost parts. The use of A/D converters may involve process changes and considerable chip die area to implement. Direct monitoring of voltages may also require that a device requiring power state control be connected to all voltages, even though there may not otherwise be a need for a particular voltage plane on that device.

SUMMARY OF THE INVENTION

Various embodiments are disclosed of a method and apparatus for broadcasting the power state of a computer system. The computer system includes a master device and one or more slave devices. In one embodiment, the master device may broadcast a message to each of the slave devices to inform the slave devices of a power state of the computer system. The master device may broadcast the message through the use of a bus protocol or a wireless protocol. The broadcast message may include a protocol header indicating the start of the broadcast transaction, a function type parameter indicating the type of broadcast transaction, and power state data indicating the power state of the computer system.

In one embodiment, each of the slave devices may read the protocol header included in the broadcast message to detect the start of a broadcast transaction, and the function type parameter to determine the type of broadcast transaction. If the function type parameter indicates a power state broadcast transaction, each of the slave devices may read the power state data included in the broadcast message and determine whether to adjust the current power state of the slave device.

Figure 1:
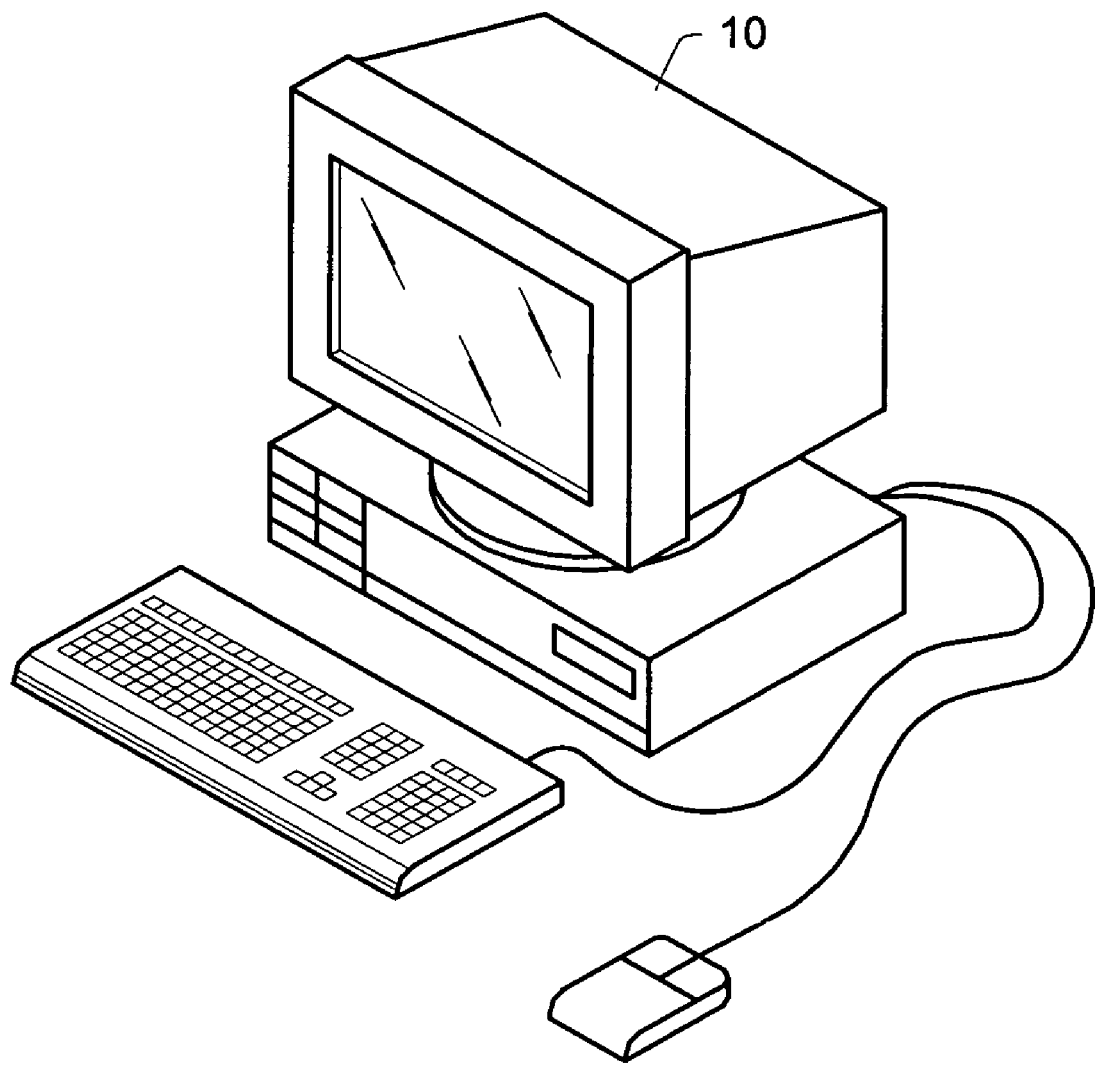
FIG. 1 is a drawing of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

FIG. 1 is a drawing of one embodiment of a computer system 10. Computer system 10 may be any of various types of computing or processing systems, including a personal computer system (PC), mainframe computer system, server system including a plurality of server blades, workstation, network appliance, Internet appliance, personal digital assistant (PDA), or other device or combinations of devices. In general, the term "computer system" can be broadly defined to encompass any device (or combination of devices) having at least one processor that executes instructions from a memory medium.

Computer system 10 may include at least one processor, which may be any of various types, including an x86 processor, e.g., a Pentium™ class, a PowerPC™ processor, a CPU from the SPARC™ family of RISC processors, as well as others. Also, computer system 10 may include one or more memory subsystems (e.g., Dynamic Random Access Memory (DRAM) devices). The memory subsystems may collectively form the main memory of computer system 10 from which programs primarily execute. The main memory may further store user applications and driver software programs. Computer system 10 may include a motherboard as well as various other components.

Serialized Secondary Bus

Figure 2:
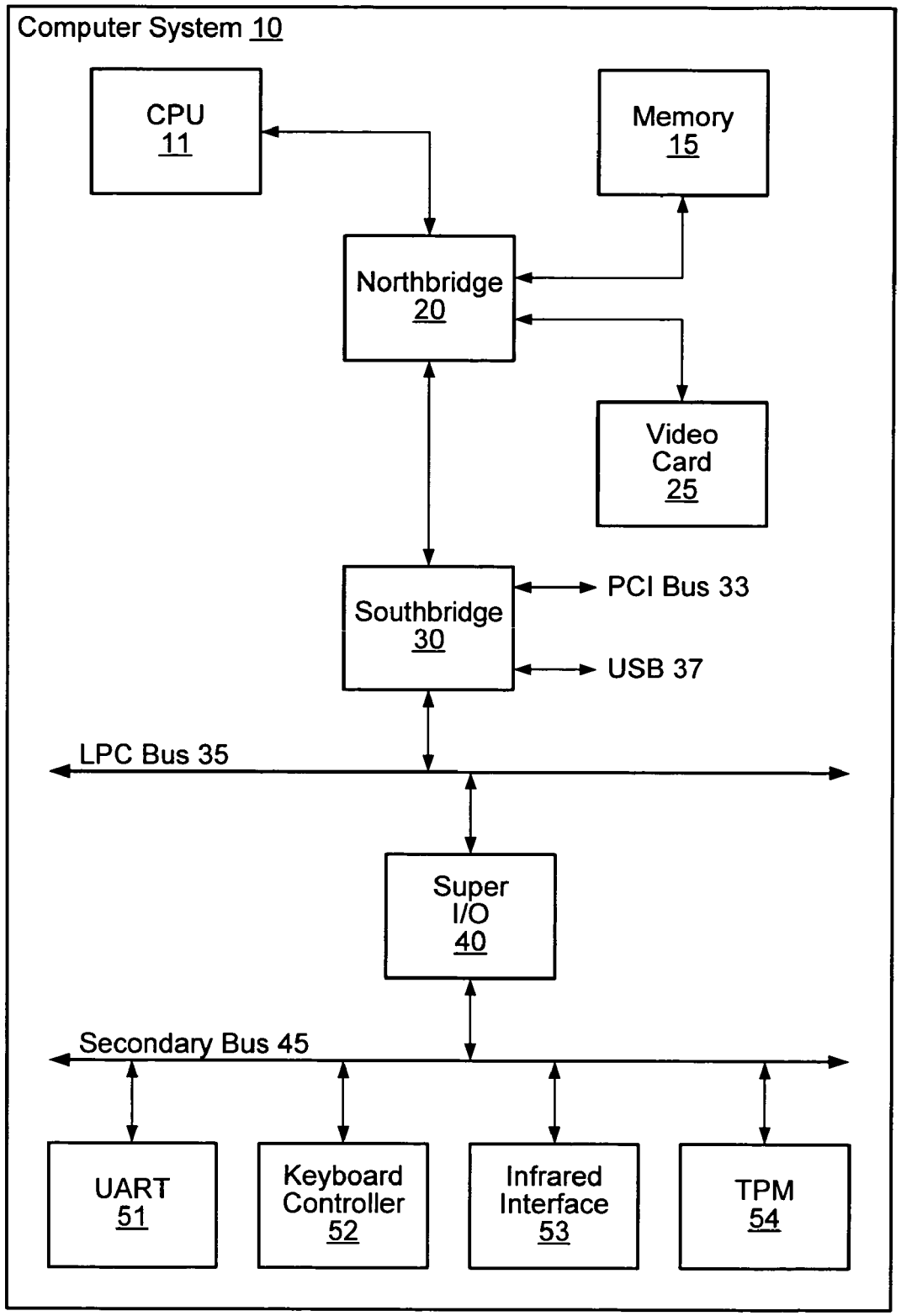
FIG. 2 is a block diagram of one embodiment of the computer system of FIG. 1.

FIG. 2 is a block diagram of one embodiment of computer system 10. As one example, FIG. 2 illustrates the components present on a motherboard of computer system 10. Computer system 10 may include a CPU 11, a northbridge 20, a main memory 15, a video card 25, and a southbridge 30. The northbridge 20 and the southbridge 30 may form the core logic chipset on the motherboard of computer system 10. It is noted that computer system 10 may include other types of logic chipsets. Logic chipsets may be defined as specialized motherboard chips on computers or expansion cards that have various characteristics and perform a variety of functions, e.g., bus bridge functions. The northbridge 20 may handle communications between at least the CPU 11, the main memory 15, and the southbridge 30. The southbridge 30 is connected to the northbridge 20 and may handle communications to and from a variety of peripheral or slave devices connected to several buses. As illustrated in the embodiment of FIG. 2, the southbridge 30 may include interfaces to at least one of the following buses: PCI bus 33, low pin count (LPC) bus 35, and USB 37. It is noted that each bus may connect to one or more devices. It is further noted that in other embodiments the southbridge 30 may interface with additional buses.

LPC bus 35 is a serial bus used to connect one or more slave devices in a computer system, as defined in the LPC interface specification version 1.1 and other versions thereof. LPC bus 35 typically includes up to thirteen signal lines; seven of the signals are required and 6 are optional. LPC bus 35 is often used in place of an industry standard architecture (ISA) bus, because it requires less signal lines.

In some implementations, a super I/O chip 40 may interface with LPC bus 35. Super I/O chips may be part of a class of I/O controller integrated circuits that combine interfaces to a variety of devices, typically low bandwidth devices, and other bus management functions in a single chip. As shown in FIG. 2, in one specific implementation, super I/O chip 40 may support several slave devices, such as a universal asynchronous receiver-transmitter (UART) 51, a keyboard controller 52, an infrared device 53, and a trusted platform module (TPM) 54. It is noted, however, that in other implementations, super I/O chip 40 may support other low bandwidth devices, e.g., a thermal sensor and a floppy drive controller. It is further noted that in some embodiments computer system 10 may include other types of bus controllers having similar functionality as super I/O chip 40.

In various embodiments, the super I/O chip 40 may include an interface for a serialized secondary bus 45. The secondary bus 45 may support all communications, including data transfer, clocking, interrupt, specialized broadcasts, and DMA requests, between super I/O chip 40 and slave devices 51-54 on three wires. Bus 45 may also support forwarding of LPC bus transfers from super I/O chip 40 to one or more of the slave devices 51-54, e.g., DMA cycles and TPM cycles on the LPC bus 35. It is noted, however, that in other embodiments bus 45 may include one or two signal lines, or at least may use less signal lines compared to LPC bus 35.

Prior art computer systems use other buses, e.g., LPC bus 35, to connect the southbridge 30 to certain slave devices, such as low bandwidth devices 51-54. However, using an LPC bus introduces some routing constraints, because space on motherboards is usually very limited and the LPC bus typically requires seven to thirteen signal lines.

In one embodiment of the invention, bus 45 is used in place of at least a portion of the LPC bus 35, as shown. Bus 45 may be a "reduced pin count" bus relative to LPC bus 35. Connecting devices 51-54 via bus 45 eliminates some of the routing constraints and congestion associated with using buses such as the LPC bus 35, because bus 45 requires less signal lines than the LPC bus 35, e.g., in some implementations bus 45 only requires three signal lines. The reduced pin count may reduce package costs and may result in lower power due to fewer switching signals. Also, moving some devices to bus 45 may reduce the loading on the LPC bus 35, which may improve the reliability of the LPC bus 35. Furthermore, as shown in the embodiment of FIG. 2, by bridging the LPC bus 35, bus 45 may extend the reach of the LPC bus 35 so that peripherals may be placed further from the southbridge 30.

Figure 3A:
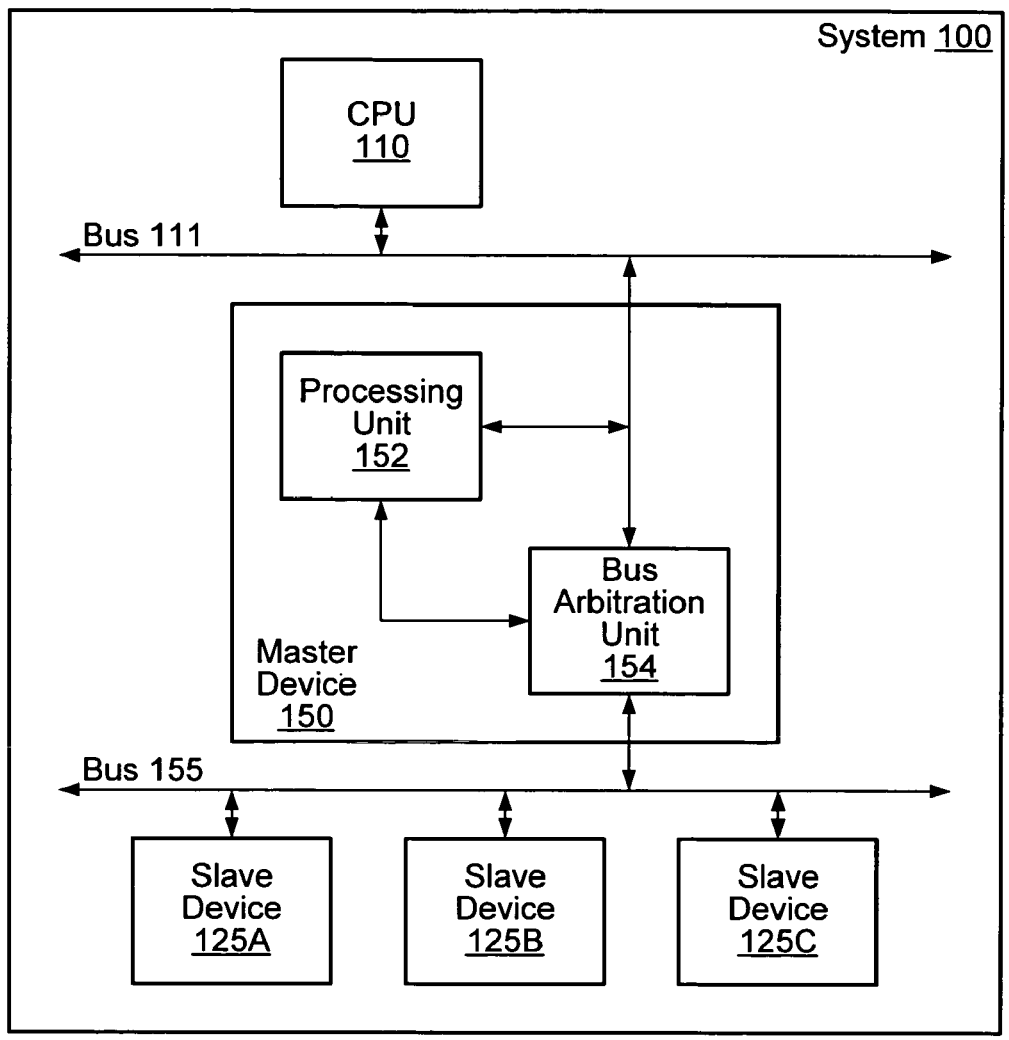
FIG. 3A is a block diagram of one embodiment of a system including a master device and a plurality of slave devices.

FIG. 3A is a block diagram of one embodiment of a system 100. It is noted that in one embodiment, system 100 may be illustrative of computer system 10 of FIG. 1 and FIG. 2. However, it is noted that system 100 may be any of various types of computing or processing systems, including a personal computer system (PC), mainframe computer system, workstation, server blade, network appliance, system-on-a-chip (SoC), Internet appliance, personal digital assistant (PDA), television system, audio systems, grid computing system, or other device or combinations of devices, which in some instances form a network. For instance, in some embodiments, master device 150 and slave devices 125 may collectively form a network, e.g., a local area network (LAN) or a wireless network. In other embodiments, system 100 may be a circuit board or motherboard of a computer system, e.g., a laptop computer.

In one specific implementation, system 100 is formed as illustrated in the embodiment of FIG. 3A. System 100 may include a CPU 110, a bus 111, a master device 150, slave devices 125A-C, and a bus 155. CPU 110 may be connected to master device 150 through bus 111, and master device 150 may be connected to the slave devices 125 via bus 155. System 100 may further include at least an address assignment mechanism and a power state broadcast mechanism, as will be described further below with reference to FIGS. 4-9. In some embodiments, master device 150 may communicate with slave device 125 through the use of a bus protocol to perform at least address assignment operations and power state broadcasts. It is noted that in other embodiments master device 150 may communicate with slave device 125 through the use of a wireless protocol.

System 100 may include a variety of slave devices, usually low bandwidth devices, such as an infrared interface, a universal asynchronous receiver-transmitter (UART), a keyboard controller, a parallel port, a serial port, a mouse interface, a thermal sensor, and floppy disk controller, among others. In one specific implementation, one of the slave devices 125 of system 100 may be a TPM, e.g., TPM 54 of FIG. 2. It is noted, however, that in other implementations system 100 may include other kinds of slave devices with different functionality. Also, in some embodiments, at least a subset of the slave devices may represent nodes on a network. It is further noted that system 100 may include any number of slave devices 125.

In various embodiments, bus 111 may be LPC bus 35, and bus 155 may be serialized secondary bus 45 described above with reference to FIG. 2. In these embodiments, bus 155 may be a "reduced pin count" bus relative to the LPC bus, e.g., a three-wire bus. It is noted, however, that in other embodiments bus 111 may be another type of bus, for example, an ISA or EISA bus. It is further noted that bus 155 may be another type of bus besides a three-wire bus, e.g., a two-wire bus or a four-wire bus, and may have various characteristics. In some embodiments, master device 150 may be configured to operate as a bus controller or I/O controller. For instance, master device may be super I/O chip 40 described above with reference to FIG. 2.

As illustrated in the embodiment of FIG. 3A, master device 150 may includes a processing unit 152 and a bus arbitration unit 154. Processing unit 152 may initiate bus transactions intended for the slave devices 125, and bus arbitration unit 154 may arbitrate ownership of bus 155 between processing unit 152 and bus 111, as will be described further below. For example, processing unit 152 of master device 150 may initiate address assignment and power state broadcast functions within system 100.

It should be noted that the components described with reference to FIGS. 2 and 3A are meant to be exemplary only, and are not intended to limit the invention to any specific set of components or configurations. For example, in various embodiments, one or more of the components described may be omitted, combined, modified, or additional components included, as desired. For instance, in some embodiments, master device 150 may not include an embedded processor, e.g., processing unit 152. Furthermore, it is noted that the components of computer system 10 or system 100 may be implemented in software and/or hardware.

During operation, CPU 110 may initiate one or more bus transactions intended for slave devices 125. CPU 110 may transmit the bus transactions to master device 150 (e.g., an I/O controller) over bus 111 (e.g., LPC bus 35). Master device 150 may translate and forward the bus transactions corresponding to bus 111 (e.g., LPC bus transactions) to one or more of the slave devices 125 over bus 155. For instance, if bus 111 is an LPC bus and bus 155 is a three-wire bus, master device 150 translates the LPC bus transactions into the protocol corresponding to the three-wire bus, and then forwards the bus transactions to one or more of the slave devices 125.

Processing unit 152 may also initiate bus transactions intended for slave devices 125. For example, in one specific implementation, processing unit 152 is an embedded microcontroller of master device 150, which manages bus transactions for slave devices 125 to off-load some tasks from CPU 110. In this manner, this architecture helps to distribute the processing needs within system 100 effectively, in addition to solving some routing challenges.

Since at any given time both processing unit 152 and bus 111 may attempt to transmit signals to one or more of the slave devices 125, bus arbitration unit 154 may arbitrate ownership of bus 155. In some embodiments, bus arbitration unit 154 may assign ownership of bus 155 based on the priority of the transaction. It is noted, however, that in other embodiments bus arbitration unit 154 may arbitrate ownership of bus 155 by other methods, e.g., LPC bus transactions may always have the highest priority, or bus ownership may alternate between bus 111 and processing unit 152. In response to receiving a bus transaction from either bus 111 or processing unit 152, one or more of the slave devices 125 performs an operation corresponding to the bus transaction, e.g., an address assignment operation or a temperature sensing function.

It is noted that some slave devices may communicate with master device 150 and CPU 110, for example, after performing a designated operation. Therefore, in various embodiments, master device 150 may also be configured to translate and forward bus transactions received from the slave devices 125 to bus 111.

Figure 3B:
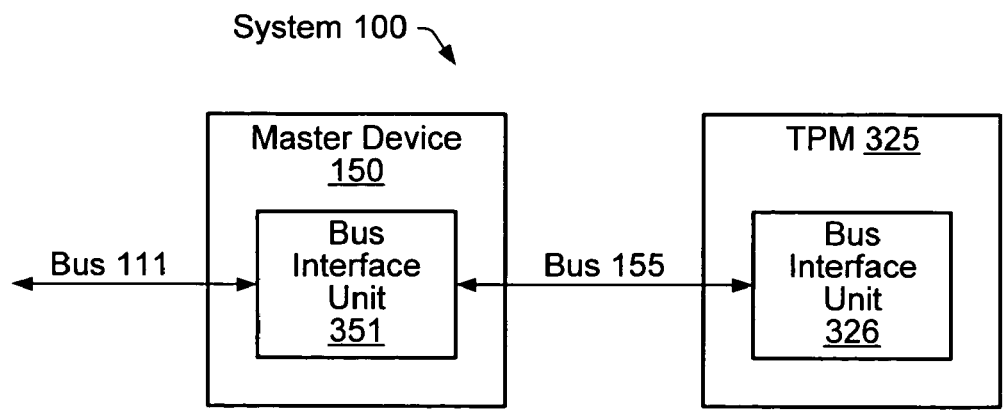
FIG. 3B illustrates a subsection of the system of FIG. 3A including a master device connected to a TPM, according to one embodiment.

FIG. 3B illustrates a subsection of system 100 including master device 150 connected to a TPM 325, according to one embodiment. As noted above, master device 150 may be configured to operate as a bus controller or I/O controller, e.g., super I/O chip 40 described above with reference to FIG. 2, and system 100 may include additional slave devices.

As illustrated, master device 150 may include a bus interface unit 351 for translating bus transactions corresponding to bus 111 to the protocol corresponding to bus 155. For example, bus interface unit 351 may translate LPC bus transactions to the protocol corresponding to the secondary bus 45 described with reference to FIG. 2. Master device 150 may then forward the bus transactions to one or more of the slave devices of system 100, e.g., TPM 325.

TPM 325 may include a bus interface unit 326 for receiving and transmitting signals over bus 155. In prior art systems, TPMs are typically designed to receive and process LPC bus transactions (see TPM specification version 1.2 and other versions thereof), and are usually manufactured in standard 40-pin QFN or 28-pin TSSOP packages. In the illustrated embodiment of FIG. 3B, bus interface unit 326 of TPM 325 is designed to read (and transmit) bus transactions corresponding to non-LPC bus 155, e.g., secondary bus 45 having three-wires. Since bus 155 has a reduced pin count relative to an LPC bus, TPM 325 may be manufactured in a reduced pin package compared to a typical TPM package, for example, an 8-pin package. An 8-pin package may result in significant cost savings over standard 28-pin or 40-pin packages, and may save considerable board space.

In one specific implementation, a prior art TPM may be modified to include bus interface unit 326 in order to interface with the reduced pin count bus 155 and to use a reduced pin packaging. Also, in this implementation, bus interface unit 351, bus 155, and bus interface unit 326 may be designed in such a way that the system software still sees a standard LPC interface, even though TPM 325 is connected via the reduced pin count bus 155. This architecture provided additional cost savings because it may allow host software transparent operations.

It is noted that bus interface unit 351 and bus interface unit 326 may be implemented in hardware, and in some embodiments some functionality is also implemented in software. In various embodiments, at least a portion of the functionality associated with bus interface unit 351 may be implemented in processing unit 152 and/or bus arbitration unit 154 of FIG. 3A. It is further noted that in some embodiments other types of slave devices (e.g., the slave devices shown in FIGS. 2 and 3) besides TPMs may be designed to include a bus interface unit similar to bus interface unit 326 to interface with the reduced pin count bus 155. Additionally, TPM 54 of FIG. 2 may be designed similar to TPM 325 of FIG. 3B.

Address Assignment

Figure 4:
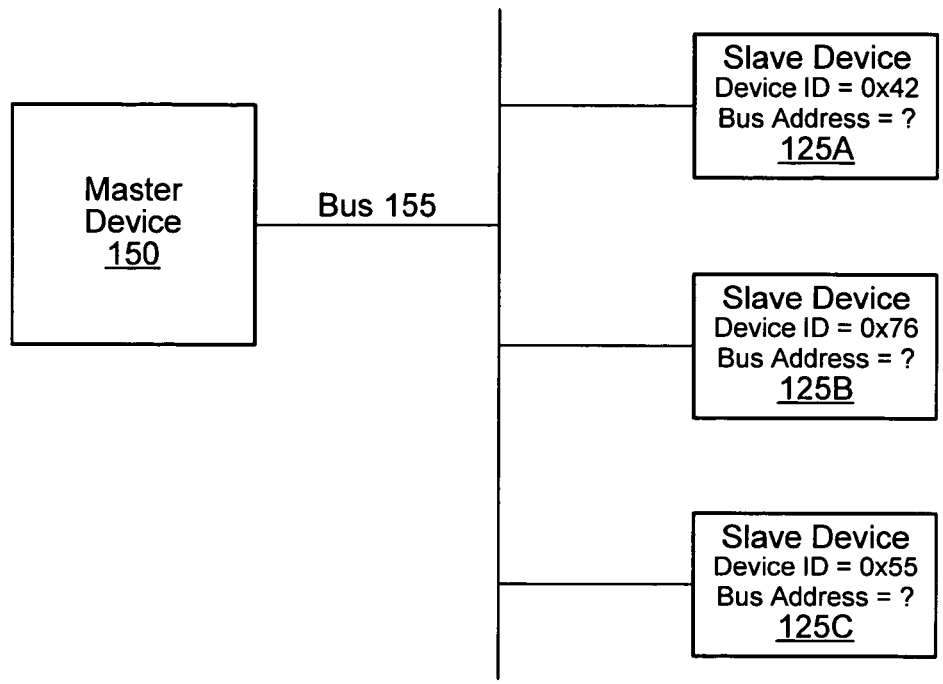
FIG. 4 illustrates one specific implementation of the system of FIG. 3A showing the initial state of the slave devices before an address assignment operation.

FIG. 4 illustrates one specific implementation of system 100 showing the initial state of slave devices 125 when they are first connected to bus 155. In this initial configuration, slave devices 125 have an internal device ID, but do not have a bus addresses until one is assigned to them, since there is no physical or positional means of identifying one slave device over another. Master device 150 cannot directly address memory locations within any of slave devices 125 until a bus address is assigned to the slave devices 125. To address slave devices 125, master device 150 also needs to determine what types of slave devices 125 are currently attached to the bus 155.

Figure 5:
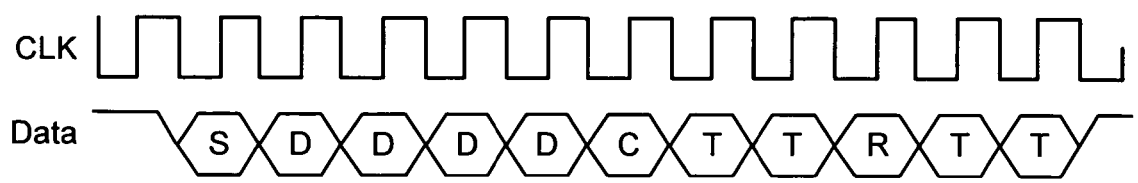
FIG. 5 illustrates one specific example of an address assignment broadcast transaction, according to one embodiment.

During operation, master device 150 may issue a broadcast transaction to initiate an address assignment operation and to determine what types of slave devices 125 are attached to bus 155. As illustrated in FIG. 5, in one specific implementation, broadcast transactions may each include a protocol header (S), a broadcast device ID (DDDD), a linear bus address (C), bus turnaround cycles (TT), and a response cycle (R). The protocol header is a bus state indicator that indicates the start of a broadcast transaction. The broadcast device ID is a parameter that indicates the type of slave device that master device 150 is searching for during the broadcast transaction for addressing purposes. The linear bus address is a linear address to be assigned to the slave device that includes an internal device ID that matches the broadcast device ID. A bus turnaround cycle is a period of time during the broadcast transaction when master device 150 relinquishes ownership of bus 155 and stops driving the bus wires. The response cycle is a period of time during the broadcast transaction reserved for a response (acknowledgement) from a matching slave device, which indicates acceptance of the bus address assignment. Although FIG. 5 illustrates a specific implementation showing the number of clock cycles it takes to broadcast the address assignment information, it is noted that in other implementations the broadcast of the information may take fewer or more clock cycles. In some embodiments, the number of clock cycles reserved for a broadcast transaction may be programmable.

It is noted that in one embodiment the order of the broadcast Device ID and the linear bus address is immaterial, as long as both master device 150 and slave devices 125 agree on the order. In one embodiment, one line of bus 155 may be used to transmit a clock and two lines of bus 155 may be used to transmit the information corresponding to a broadcast transaction. It is noted, however, that in other embodiments the clock and data may be transmitted through bus 155 by other mechanisms, for example a single line of bus 155 may be used to transmit the broadcast information. It is noted that bus 155 does not include dedicated chip select lines.

Figure 6:
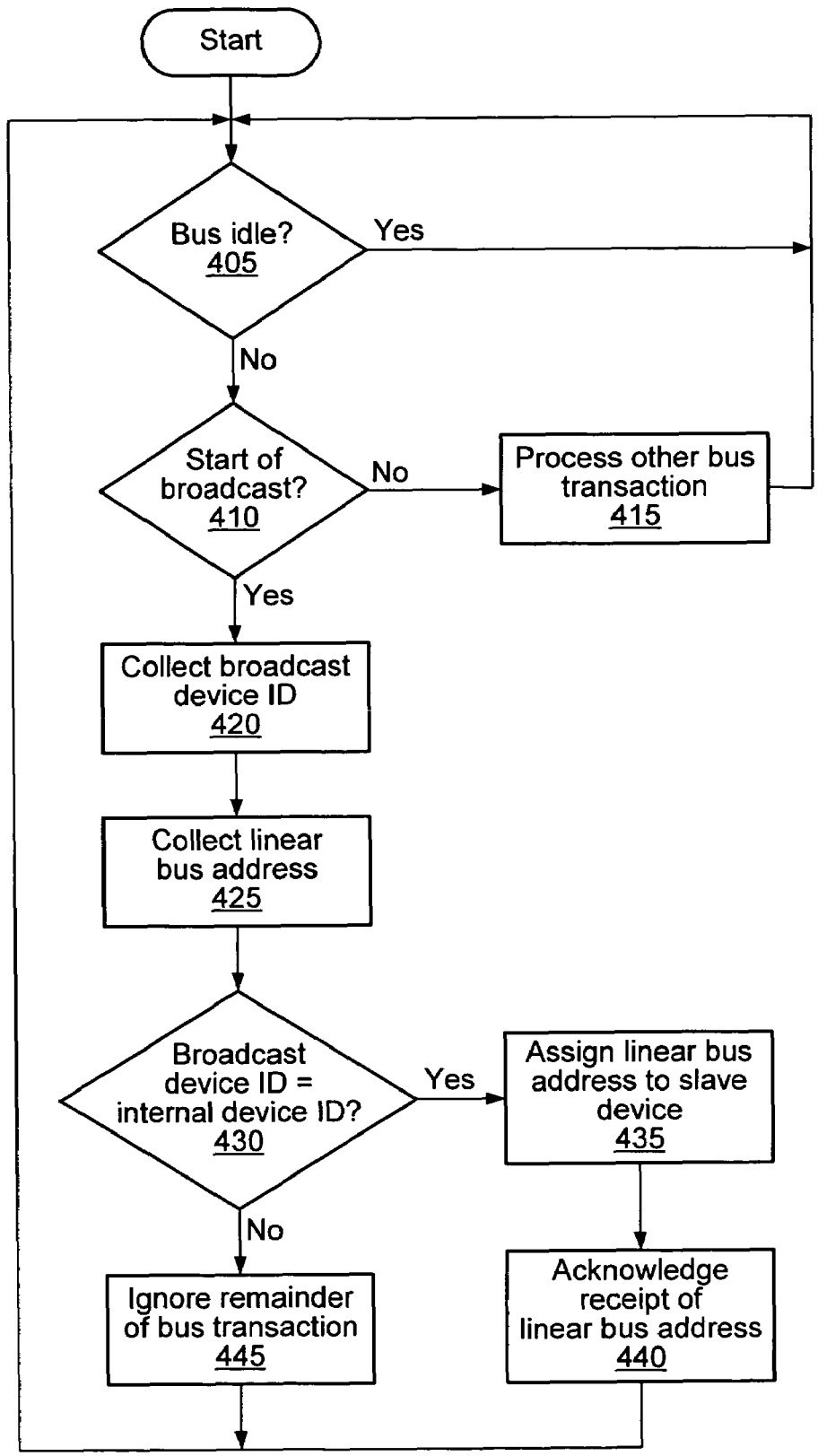
FIG. 6 is a flow diagram illustrating the address assignment process after transmission of the broadcast message to the slave devices, according to one embodiment.

To initiate a broadcast transaction, master device 150 may broadcast a message to each of the slave devices 125. The broadcast message may include a protocol header, a broadcast device ID, and a linear bus address. In one embodiment, a transceiver or other transmission mechanism of master device 150 may broadcast the message to the slave devices 125. FIG. 6 is a flow diagram illustrating the address assignment process after transmission of the broadcast message to the slave devices 125, according to one embodiment. It should be noted that in various embodiments, some of the steps shown may be performed concurrently, in a different order than shown, or omitted. Additional steps may also be performed as desired.

Referring collectively to the embodiments illustrated in FIG. 4 and FIG. 6, during operation, each of the slave devices 125 determines whether bus 155 is idle, as indicated by block 405. If the bus is not idle, slave devices 125 determine whether the bus activity constitutes the start of a broadcast transaction (block 410). More specifically, slave devices 125 may determine whether a broadcast message has been received by reading a received protocol header. If the protocol header indicates another kind of transaction besides a broadcast transaction, slave devices 125 process the transaction, as indicated by block 415. If the protocol header indicates that a broadcast message has been received, slave devices 125 read additional data of the broadcast message to determine the kind of transaction. After reading the broadcast device ID (block 420), slave devices 125 determine that it is an address assignment transaction and may also read the linear bus address, as indicated by block 425.

Each slave device 125 of system 100 may store an internal device ID. In block 430, each of the slave devices 125 determines whether the broadcast device ID included in the received broadcast message matches an internal device ID associated with the slave device. In one embodiment, each slave device 125 may include a comparator or similar mechanism for performing the compare operation. As described above, system 100 may include one or more types of slave devices 125. Each type of slave device may be associated with a particular internal device ID. In other words, slave devices of the same type may include the same internal device ID. In some embodiments, slave devices of the same "type" may be defined to have the same part number, or may be devices of the same class. In general, slave devices of the same type may be defined to have the same functionality (except for immaterial variations that are inherent in electronics). Each slave device 125 may include memory for storing an internal device ID.

If the broadcast device ID included in the received broadcast message matches the internal device ID of one of the slave devices 125, the slave device assigns itself the linear bus address included in the received broadcast message, as indicated by block 435. In one embodiment, the slave device may copy the linear bus address into a local register. It is noted, however, that in other embodiments the slave device assigns itself the linear bus address by other methods. The remaining slave devices 125 that did not have a matching internal device ID ignore the remainder of the bus transaction, as indicated by block 445.

In block 440, after assigning itself the linear bus address, the slave device may send an acknowledgement message to master device 150 to acknowledge receipt of the linear bus address, which indicates that the broadcast device ID matched the internal device ID of the slave device. In various embodiments, the slave device may send the acknowledgement message during the response cycle of the broadcast transaction, immediately following a bus turnaround cycle. Master device 150 may receive the acknowledgement message using a transceiver or other receiver mechanism and may store the indicated assignment information. Subsequent I/O transaction involving the slave device may use the newly assigned linear bus address to communicate with the slave device.

If the broadcast device ID does not match any of the internal device IDs of the slave devices 125, then the bus transaction is unacknowledged and master device 150 is thus informed that the particular type of slave device associated with the broadcast device ID is not connected to bus 155. In one embodiment, master device 150 may reserve a limited amount of time for slave devices to acknowledge. If the bus transaction is unacknowledged after the amount of time lapses, master device 150 determines that the particular type of slave device associated with the broadcast device ID is not connected to bus 155.

In sum, master device 150 may first use an associative matching scheme to communicate with a particular type of slave device having an internal device ID that matches the broadcast device ID. As described above, slave devices of the same type include the same internal device ID. Then, within the same address assignment broadcast transaction, a linear matching scheme may be implemented to address the slave device. More specifically, a slave device including an internal device ID that matches the broadcast device ID assigns itself the linear bus address included in the received broadcast message. After the address assignment, subsequent bus transactions use the assigned linear bus address to communicate with the slave device. It is noted that subsequent bus transactions do not use the device ID to communicate with the slave device. In various embodiments, the linear bus address is much shorter than the device ID. For example, a computer system with four slave devices may use a linear bus address of two bits, whereas the device ID may be eight bits or more. Therefore, with this address assignment mechanism, bus transactions that use the linear bus address rather than the device ID may save bus bandwidth. It is noted, however, that in other embodiments two or more devices or mechanisms, e.g., of system 100, may initiate the address assignment broadcast transaction.

It is noted that the mechanisms described in the above embodiments with reference to FIG. 6 are not intended to limit the invention to certain specific steps. For instance, in various other embodiments, master device 150 may perform the address assignment operation in two transactions. The first transaction broadcasts the device ID and the second transaction broadcasts the linear bus address. After the first transaction, the slave devices 125 may save the broadcast device ID for use when it subsequently receives the linear bus address in the second transaction. The slave devices 125 may acknowledge receipt of the device ID and/or the linear bus address. In other embodiments, master device 150 may not wait for acknowledgement from the slave devices 125.

As described above, the broadcast message may be transmitted through the use of a bus protocol. The broadcast message includes a protocol header to indicate the start of an address assignment broadcast transaction. The bus 155 may be used to perform other operations, such as data transfer operations, in addition to address assignment operations. In some embodiments, the broadcast message may be transmitted using a wireless protocol.

Master device 150 may initiate multiple broadcast transactions in a row, or at various instances in time, to check for all possible types of slave devices 125. In this manner, each of the slave devices 125 may be assigned a linear bus address. For example, suppose a slave device with a UART includes a device ID of 0x42, a slave device with an infrared interface includes a device ID of 0x84, a thermal sensor includes a device ID of 0x76, and a general purpose I/O chip includes a device ID of 0x55. If all four devices may be attached to bus 155, master device 150 may issue a broadcast transaction for each of the device IDs 0x42, 0x84, 0x76 and 0x55.

Figure 7:
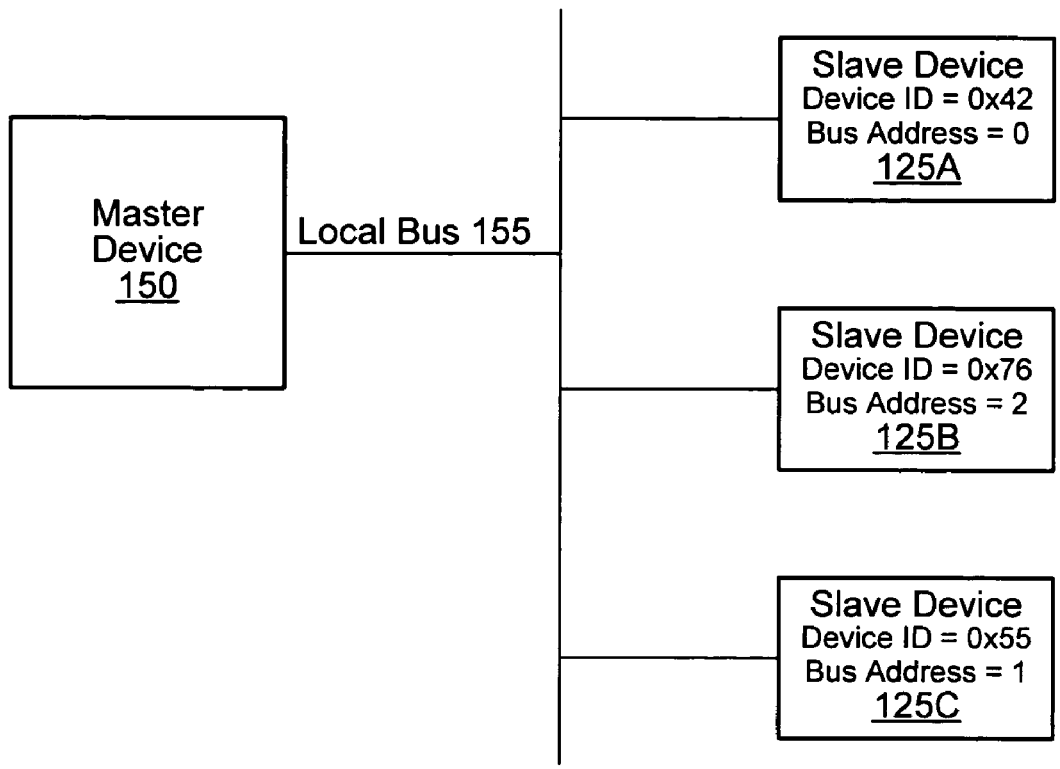
FIG. 7 illustrates one specific implementation of the system of FIG. 3A showing the final state of the slave devices after the address assignment operation.

In one embodiment, master device 150 may increment the linear bus address each time a successful match is made. For instance, as illustrated in the embodiment of FIG. 4, if bus 155 has a UART, a thermal sensor, and general purpose I/O chip, but not an infrared interface, then the sequence of broadcast transactions, with associated linear bus addresses, might be: 0x42:0; 0x84:1; 0x76:1; and 0x55:2. In other words, if the device ID included in a broadcast message does not match the internal device ID associated with the slave devices (e.g., 0x84:1), master device 150 may continue broadcasting messages including different device IDs and the same linear bus address (e.g., 0x76:1) until the linear bus address is assigned to one of the slave devices. In this example, after this sequence of broadcasts, the UART may have a linear bus address of 0, the thermal sensor may have a linear bus address of 1, and the general purpose I/O chip may have a linear bus address of 2. FIG. 7 shows the final state of slave devices 125 after the address assignment operation, according to this specific implementation.

It is noted that if multiple slave devices of the same type are connected to bus 155, only one of the slave devices of the same type may be assigned a linear bus address. In some embodiments, if some applications require multiple slave devices of the same type, the hardware and/or software of system 100 may be manufactures and developed such that all the slave devices of the same type are assigned a linear bus address. For example, the internal device IDs of these devices may be varied by only one bit. It is noted, however, that in other embodiments the slave devices of the same type may be assigned linear bus addresses by other methods.

Power State Broadcast

During operation, master device 150 may issue a broadcast transaction to inform slave devices 125 about the power state of system 100. Master device 150 may initiate this type of broadcast transaction at any point in time, before or after slave devices 125 have been addressed. In other words, a broadcast transaction may be a type of bus transaction that broadcasts a message to each of the slave devices 125 that are connected to master device 150 without using bus addresses. A power state broadcast may be initiated when the power state of system 100 changes, e.g., when a new slave device 125 is connected. Master device 150 may also issue a power state broadcast at certain intervals of time to update slave devices 125.

Figure 8:
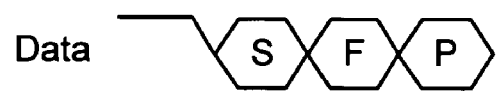
FIG. 8 illustrates one specific example of a power state broadcast transaction, according to one embodiment.

As illustrated in FIG. 8, in one specific implementation, the broadcast transaction includes a protocol header (S), a function type parameter (F), and the actual power state data (P). The protocol header is a bus state indicator that indicates the start of a broadcast transaction. The function type parameter is a parameter that indicates the type of function associated with the broadcast transaction. In this case, the function type parameter indicates a power state broadcast transaction. The power state data indicates the power state of system 100. More specifically, the power state data may indicate the overall power state of system 100 and/or the power state of one or more particular power supplies of system 100. It is noted, however, that in other embodiments the power state data may be used to inform slave devices 125 of additional power characteristics of system 100. It is also noted that the broadcast of the power state information may take any number of clock cycles. In some embodiments, the number of clock cycles reserved for a broadcast transaction may be programmable.

In one embodiment, one line of bus 155 may be used to broadcast the power state information and another line may be used to transmit the clock. It is noted, however, that in other embodiments the power state information may be broadcast through bus 155 by other mechanisms, for example two lines of bus 155.

Figure 9:
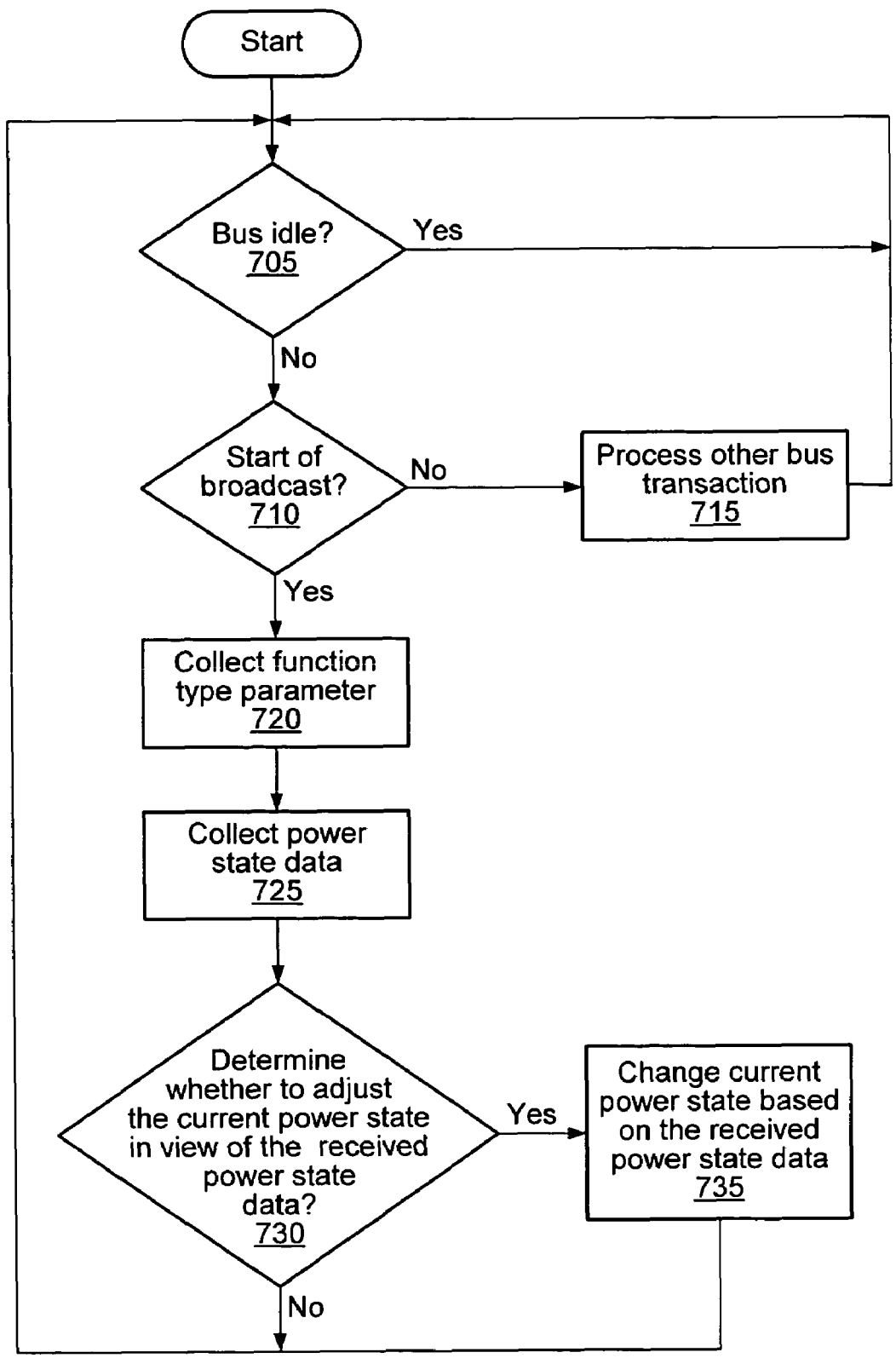
FIG. 9 is a flow diagram illustrating the power state retrieval process after transmission of the broadcast message to the slave devices, according to one embodiment.

To initiate a broadcast transaction, master device 150 may broadcast a message to each of the slave devices 125. The broadcast message may include a protocol header, a function type parameter, and power state data. FIG. 9 is a flow diagram illustrating the power state retrieval process after transmission of the broadcast message to the slave devices 125, according to one embodiment. It should be noted that in various embodiments, some of the steps shown may be performed concurrently, in a different order than shown, or omitted. Additional steps may also be performed as desired.

During operation, each of the slave devices 125 determines whether bus 155 is idle, as indicated by block 705. If the bus is not idle, slave devices 125 determine whether the bus activity constitutes the start of a broadcast transaction (block 710). More specifically, slave devices 125 may determine whether a broadcast message has been received by reading a received protocol header. If the protocol header indicates another kind of transaction besides a broadcast transaction, slave devices 125 process the transaction, as indicated by block 715. If the protocol header indicates that a broadcast message has been received, slave devices 125 then read the function type parameter to determine the type of broadcast transaction, as indicated by block 720. After determining that it is a power state broadcast transaction, slave devices 125 read the power state data included in the broadcast message, as indicated by block 725.

In block 730, each of the slave devices 125 determines whether to adjust its current power state in view of the power state data included in the broadcast message. First, each of the slave devices 125 may determine whether the received power state data indicates that system 100 is in a different power state compared to its current power state. For example, the received power state data may indicate that system 100 is operating in a reduced power mode, or a normal power mode, and therefore each of the slave devices 125 may determine whether to change to a reduced power state, or a normal power state, respectively. Then, in various implementations, each of the slave devices 125 may take into account a multitude of other factors in determining whether to change its current power state, for example, some slave devices 125 may detect whether there are any currently executing or any pending transactions, and the amount of processing power being used. Some slave devices 125 may also analyze current activity trends and access historical information to determine whether to change their current power state. It is noted that in other implementations slave devices 125 may consider additional factors.

For each of the slave devices 125, if the receive power state data indicates that system 100 is in a different power state compared to its current power state and the additional factors allow a change in power state, the slave device changes its power state based on the received power state data, as indicated in block 735. It is noted, however, that in some embodiments a slave device may change its power state in view of other factors even though the received power state data indicates that the power state of system 100 is the same as the current power state of the slave device.

As described above, the broadcast message may be transmitted through the use of a bus protocol. The broadcast message includes a protocol header to indicate the start of a power state broadcast transaction. The bus 155 may be used to perform other operations, such as data transfer operations, in addition to power state broadcast transactions. Since slave devices 125 may receive power state information and data transfers via bus 155, slave devices 125 may not need dedicated pins to receive power state signals. It is noted that in some embodiments the broadcast message may be transmitted using a wireless protocol.

It is further noted that bus 155 may be used to perform other types of broadcast transactions using the mechanism described above with reference to FIGS. 8 and 9. In various embodiments, a broadcast transaction similar to the power state broadcast may be used to send other global information about the system, e.g., the current clock frequency of the bus 155 and/or bus 111.

Any of the embodiments described above may further include receiving, sending or storing instructions and/or data that implement the operations described above in conjunction with FIGS. 1-9 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a plurality of slave devices;
   a master device configured to broadcast a message to each of the plurality of slave devices to inform the plurality of slave devices of a power state of the computer system;
   wherein the master device is configured to broadcast the message through the use of a protocol;
   wherein the broadcast message includes at least power state data indicating the power state of the computer system; and
   wherein each of the plurality of slave devices is configured to read the power state data included in the broadcast message and determine whether to adjust a current power state of the slave device based on the power state data and one or more of:
   current activity trends
   historical information of activity trends;
   currently executing transactions;
   pending transactions; or
   amount of processing power being used.

2. The computer system of claim 1, wherein the broadcast message further includes a protocol header indicating the start of a broadcast transaction.

3. The computer system of claim 1, wherein the broadcast message further includes a protocol header indicating the start of a broadcast transaction, and a function type parameter indicating the type of broadcast transaction.

4. The computer system of claim 3, wherein each of the plurality of slave devices is configured to read the protocol header included in the broadcast message to detect the start of a broadcast transaction, and the function type parameter included in the broadcast message to determine the type of broadcast transaction, wherein in response to reading the function type parameter indicating a power state broadcast transaction each of the plurality of slave devices is configured to read the power state data included in the broadcast message and determine whether to adjust the current power state of the slave device.

5. The computer system of claim 1, wherein the master device is configured to broadcast the message through the use of a bus protocol.

6. The computer system of claim 1, wherein the master device is configured to broadcast the message through the use of a wireless protocol.

7. The computer system of claim 1, wherein, if the power state data included in the broadcast message indicates that the computer system is in a reduced power mode, each of the plurality of slave devices is configured to determine whether to change its current power state to a reduced power mode.

8. The computer system of claim 1, wherein, if the power state data included in the broadcast message indicates that the computer system is in a normal power mode, each of the plurality of slave devices is configured to determine whether to change its current power state to a normal power mode.

9. The computer system of claim 1, wherein the master device is configured to broadcast the message to each of the plurality of slave devices through a single bus line.

10. The computer system of claim 1, wherein the master device is configured to broadcast the message to each of the plurality of slave devices through two or more bus lines.

11. The computer system of claim 1, wherein each of the plurality of slave devices is configured to determine the power state of the computer system without the use of one or more dedicated power pins for receiving power state signals.

12. A method for managing power in a computer system, the method comprising:
   broadcasting a message through the use of a protocol to each of a plurality of slave devices comprised in the computer system to inform the plurality of slave devices of a power state of the computer system, wherein the broadcast message includes at least power state data indicating the power state of the computer system;
   each of the plurality of slave devices reading the power state data included in the broadcast message; and
   each of the plurality of slave devices determining whether to adjust its current power state based on the power state data and one or more of:
   current activity trends;
   historical information of activity trends;

currently executing transactions;
pending transactions; or
amount of processing power being used.

13. The method of claim 12, further comprising each of the plurality of slave devices reading the protocol header included in the broadcast message to detect the start of a broadcast transaction.

14. The method of claim 13, further comprising, each of the plurality of slave devices reading the function type parameter included in the broadcast message to determine the type of broadcast transaction, wherein, in response to reading the function type parameter indicating a power state broadcast transaction, each of the plurality of slave devices reading the power state data included in the broadcast message, and determining whether to adjust its current power state.

15. The method of claim 12, further comprising broadcasting the message through the use of a bus protocol.

16. The method of claim 12, further comprising broadcasting the message through the use of a wireless protocol.

17. The method of claim 12, further comprising broadcasting the message to each of the plurality of slave devices through a single wire bus line.

18. The method of claim 12, further comprising broadcasting the message to each of the plurality of slave devices through a bus line comprising two or more wires.

19. A slave device comprised in a computer system and configured to receive a message broadcast from a master device comprised in the computer system to inform the slave device of a power state of the computer system, wherein the master device is configured to broadcast the message through the use of a bus protocol, wherein the broadcast message includes at least power state data indicating the power state of the computer system, wherein the slave device is configured to read the power state data included in the broadcast message and determine whether to adjust a current power state of the slave device based on other factors when the power state data indicates that the power state of the computer system is the same as the current power state of the slave device.

20. A master device comprised in a computer system and configured to broadcast a message to a plurality of slave devices comprised in the computer system to inform the slave devices of a power state of the computer system, wherein the master device is configured to broadcast the message through the use of a bus protocol, wherein the broadcast message includes at least power state data indicating the power state of the computer system, wherein each of the plurality of slave devices is configured to read the power state data included in the broadcast message and determine whether to adjust a current power state of the slave device, and wherein the master device is configured to broadcast the message when a new slave device is connected to the computer system.

21. A motherboard comprising:
a first bus and a second bus a plurality of slave devices coupled to the second bus;
an I/O interface controller configured to interface the first bus to the second bus, and further configured to broadcast a message to each of the plurality of slave devices over the second bus to inform the plurality of slave devices of a power state of a computer system;
wherein the I/O interface controller is configured to broadcast the message through the use of a bus protocol;
wherein the broadcast message includes at least power state data indicating the power state of the computer system; and
wherein each of the plurality of slave devices is configured to read the power state data included in the broadcast message and determine whether to adjust a current power state of the slave device based on the power state data.

* * * * *

UNITED STATES PATENT AND TRADEMARK OFFICE
CERTIFICATE OF CORRECTION

PATENT NO. : 7,707,437 B2  Page 1 of 1
APPLICATION NO. : 11/417855
DATED : April 27, 2010
INVENTOR(S) : Berenbaum et al.

It is certified that error appears in the above-identified patent and that said Letters Patent is hereby corrected as shown below:

In the Claims:

Column 14
Line 18, please delete "a first bus and a second bus a plurality" and substitute -- a first bus and a second bus; a plurality --.

Signed and Sealed this

Fifteenth Day of June, 2010

David J. Kappos
*Director of the United States Patent and Trademark Office*